United States Patent [19]
Kanai et al.

[11] Patent Number: 4,616,847
[45] Date of Patent: Oct. 14, 1986

[54] SUSPENSION SYSTEM FOR VEHICLE
[75] Inventors: Seita Kanai; Takashi Hirochika, both of Hiroshima, Japan
[73] Assignee: Mazda Motor Corporation, Japan
[21] Appl. No.: 716,947
[22] Filed: Mar. 28, 1985
[30] Foreign Application Priority Data
Apr. 2, 1984 [JP] Japan ................... 59-66597
[51] Int. Cl.⁴ ................... B60G 11/28
[52] U.S. Cl. ................... 280/707; 280/6 R
[58] Field of Search .............. 280/707, 701, 6 R, 6 H
[56] References Cited
U.S. PATENT DOCUMENTS
4,270,771 6/1981 Fujii ................... 280/707
FOREIGN PATENT DOCUMENTS
44509 3/1982 Japan ................... 280/707

Primary Examiner—John J. Love
Assistant Examiner—Ross Weaver
Attorney, Agent, or Firm—Gerald J. Ferguson, Jr.; James E. Bryan; Michael P. Hoffman

[57] ABSTRACT

In a suspension system for a vehicle, each of front and rear suspensions for respectively supporting the front and rear wheels is connected to the vehicle body by way of an adjustable-height supporting member which supports the vehicle body to be variable in height, and at the same time, the front and rear suspensions are arranged so that the rate of change of the roll center height due to bump/rebound is larger in the rear suspension than in the front suspension. The adjustable-height supporting member is controlled to change the vehicle height according to the vehicle speed to be higher during low speed travel than during high speed travel.

11 Claims, 10 Drawing Figures

SUSPENSION SYSTEM FOR VEHICLE

BACKGROUND OF THE INVENTION

1. Field of the Invention

This invention relates to a suspension system for a vehicle.

2. Description of the Prior Art

As is well known, it is preferred that the steering characteristics of a vehicle have a relatively strong understeer tendency during high speed travel of the vehicle and have a relatively weak understeer tendency or an oversteer tendency during low speed travel of the vehicle. However, there has been realized no vehicle which can meet both of these two requirements, which are essentially incompatible with each other.

SUMMARY OF THE INVENTION

The primary object of the present invention is to provide a suspension system for a vehicle in which the steering characteristics of the vehicle can have a relatively strong understeer tendency when the vehicle travels at high speed but can have a relatively weak understeer tendency or an oversteer tendency during low speed travel.

Another object of the present invention is to provide a suspension system for a vehicle in which the understeer tendency of the steering characteristics of the vehicle is enhanced as the vehicle speed increases and is weakened as the vehicle speed is reduced, thereby increasing both the running stability at high speed and the cornering performance at low speed.

In accordance with the present invention, each of front and rear suspensions for respectively supporting the front and rear wheels is connected to the vehicle body by way of an adjustable-height supporting means which supports the vehicle body to be variable in height, and at the same time, the front and rear suspensions are arranged so that the rate of change of the roll center height due to bump/rebound is larger in the rear suspension than in the front suspension, and the vehicle height is changed according to the vehicle speed to be higher during low speed travel than during high speed travel.

Generally the cornering force acting on the wheels of a vehicle upon cornering is reduced with increase in the moving load acting on the wheels due to inclination of the vehicle body and the moving load is determined by the height of the roll center as a factor.

That is, when the vehicle height is reduced in the suspension system of the present invention and the roll center height is thereby reduced, the rate of reduction in the moving load due to the reduction of the roll center height is smaller in the front suspension than in the rear suspension since the rate of change of the roll center height is smaller in the front suspension than in the rear suspension, and accordingly the cornering force acting on the wheels according to the magnitude of the moving load is not so increased in the front wheels as in the rear wheels. In other words, the amount of increase in the cornering force due to reduction of the vehicle height is smaller in the front wheels than in the rear wheels, and accordingly the ratio of the side slip the front wheels experience upon cornering to the same the rear wheels experience upon cornering is increased, whereby understeer tendency is enhanced. On the other hand, when the vehicle height is increased and the roll center height is thereby increased, the rate of increase in the moving load due to the increase of the roll center height is larger in the rear suspension than in the front suspension since the rate of change of the roll center height is larger in the rear suspension than in the front suspension, and accordingly the cornering force acting on the wheels according to the magnitude of the moving load is more reduced in the rear wheels than in the front wheels. In other words, the amount of reduction in the cornering force due to increase in the vehicle height is larger in the rear wheels than in the front wheels, and accordingly the ratio of the side slip the rear wheels experience upon cornering to the same the front wheels experience upon cornering is increased, whereby understeer tendency is weakened.

The relations between the cornering force and the moving load, and between the moving load and the roll center height will be briefly described with reference to FIGS. 1 and 2, hereinbelow.

Figure 1:
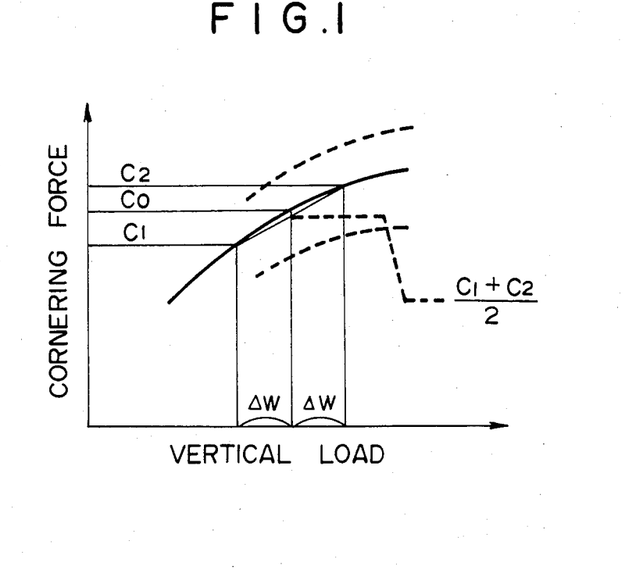
FIG. 1 is a view for illustrating the relation between the cornering force and vertical load.

The relation between the cornering force acting on the wheels and the vertical load acting thereon is as shown by the curves in FIG. 1. When the vehicle body is inclined upon cornering and the weight of the vehicle body acts unequally on the right and left wheels, that is, when moving loads of $\pm \Delta W$ act on the right and left wheels, the average of the cornering forces C1 and C2 acting on the wheels is equal to $(C1+C2)/2$. As can be seen from FIG. 1, the average cornering force $(C1+C2)/2$ is smaller than the average cornering force C0 which would be obtained if the weight of the vehicle should uniformly act on the right and left wheels without moving load and accordingly when moving load acts, the cornering force is reduced. The tendency toward reduction of the cornering force is enhanced as the moving load $\Delta W$ is enlarged.

Figure 2:
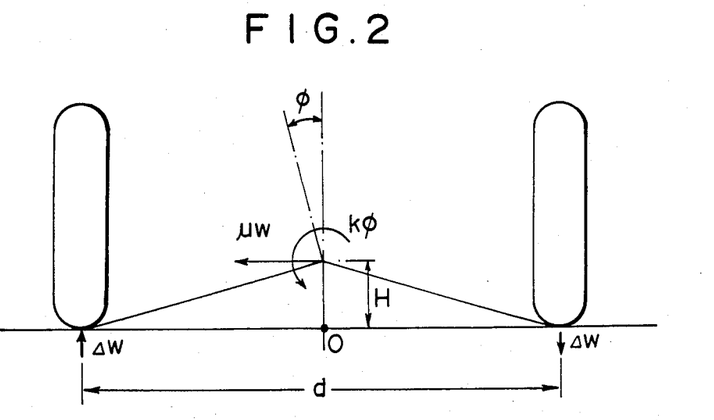
FIG. 2 is a view for illustrating balance of moments in a suspension during cornering.

In order to obtain the relation between the moving load and the roll center height, balance of moments in the suspension system during cornering, e.g. balance of moments about point O (the intersection of the vertical center line of the vehicle body and the ground), will be first considered with reference to FIG. 2. When the centrifugal force for the centripetal acceleration coefficient of $\mu$ is represented by $\mu W$, the roll center height by H, the suspension rolling rigidity by k, the rolling angle of the vehicle body by $\phi$, the distance between the right and left wheels by d, and the moving load acting on the wheels by $\Delta W$, the following equation holds.

$$\mu W \cdot H + k\phi = d \cdot \Delta W$$

Therefore, $$\Delta W = (\mu W \cdot H + k\phi)/d$$

As can be understood from the above equation, the moving load $\Delta W$ increases with increase in the roll center height H. Accordingly, in the rear suspension in which the roll center height changes by a larger amount for a given change in the vehicle height than in the front suspension, the moving load changes by a larger amount than in the front suspension when the vehicle body is inclined during cornering. Accordingly the cornering force acting on the wheels changes by a larger amount in the rear wheels than in the front wheels. Thus the understeer tendency is enhanced or weakened with change in the roll center height as described above in accordance with the present invention.

As said adjustable-height supporting means for supporting the vehicle body to be variable in height, there has been known, for instance, a fluid actuator as disclosed in Japanese Unexamined Patent Publication No. 57(1982)-118907 in which the vehicle height can be changed by feeding or discharging fluid such as pressurized air or oil to or from the fluid actuator. A suspension system associated with such an actuator is generally referred to as a "hydropneumatic suspension".

DESCRIPTION OF THE PREFERRED EMBODIMENT

Figure 3:
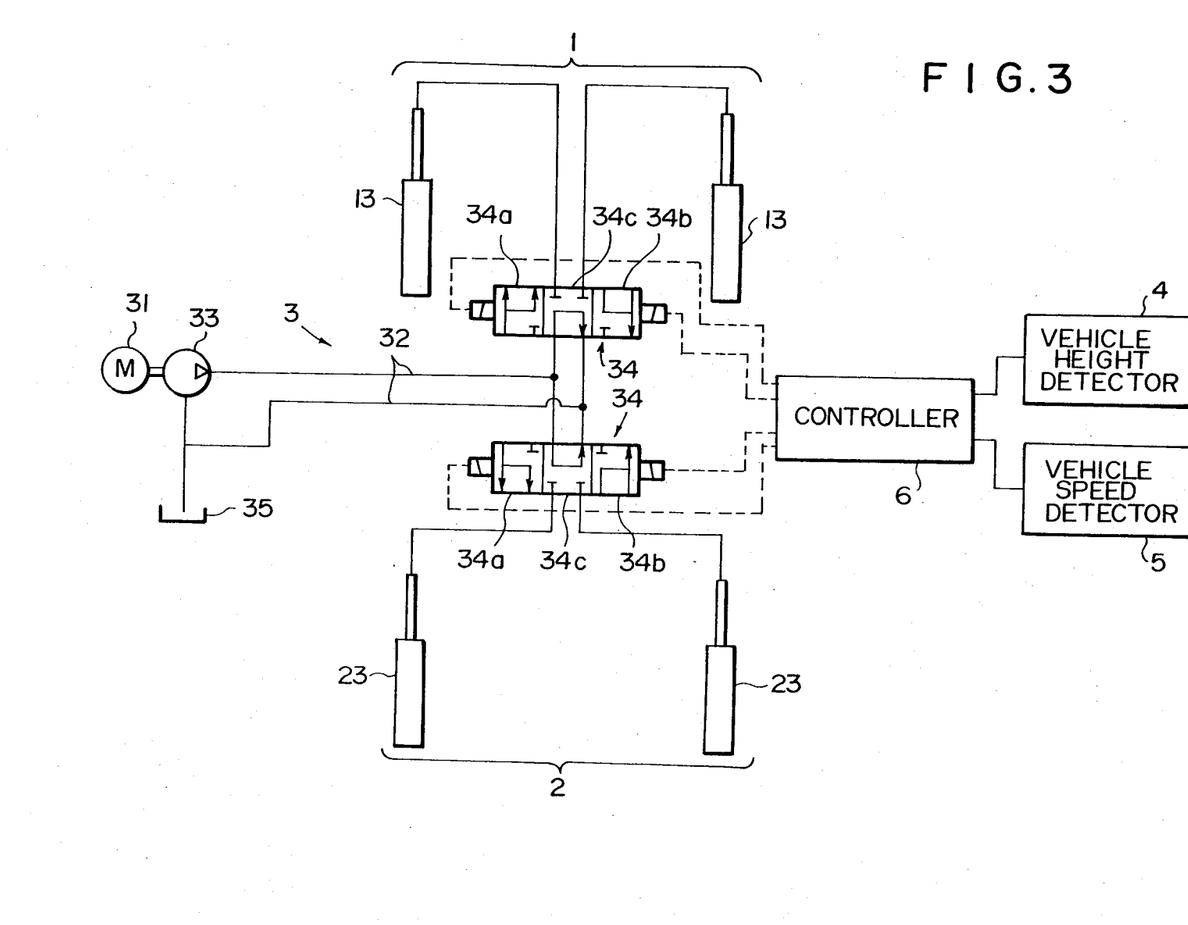
FIG. 3 is a schematic view showing a suspension system in accordance with an embodiment of the present invention.
Figure 4:
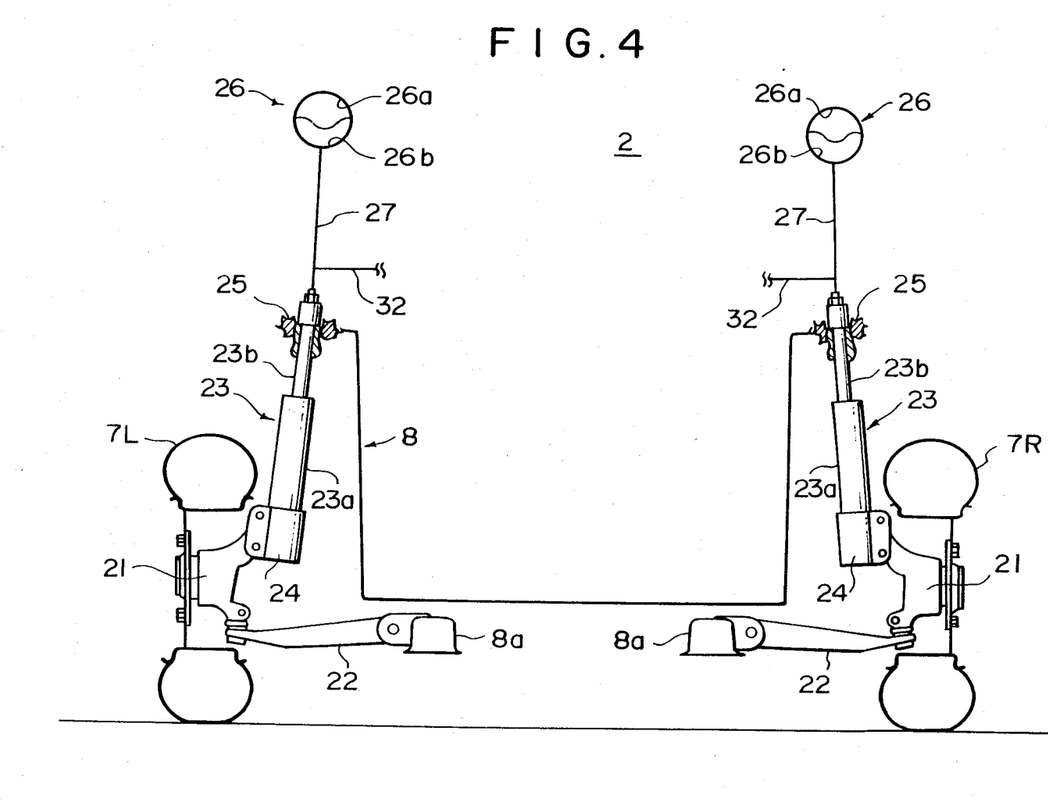
FIG. 4 is a schematic view showing the rear suspension employed in the suspension system of FIG. 3.

In FIG. 3, a suspension system for a vehicle in accordance with an embodiment of the present invention includes a front suspension 1 for supporting right and left front wheels (not shown), and a rear suspension 2 for supporting right and left rear wheels 7R and 7L (FIG. 4). The front and rear suspensions 1 and 2 are respectively provided with strut members 13 and 23 and by feeding or discharging pressurized oil to or from the strut members 13 and 23, the height of the vehicle body can be changed as will be described in detail, later.

Figure 5:
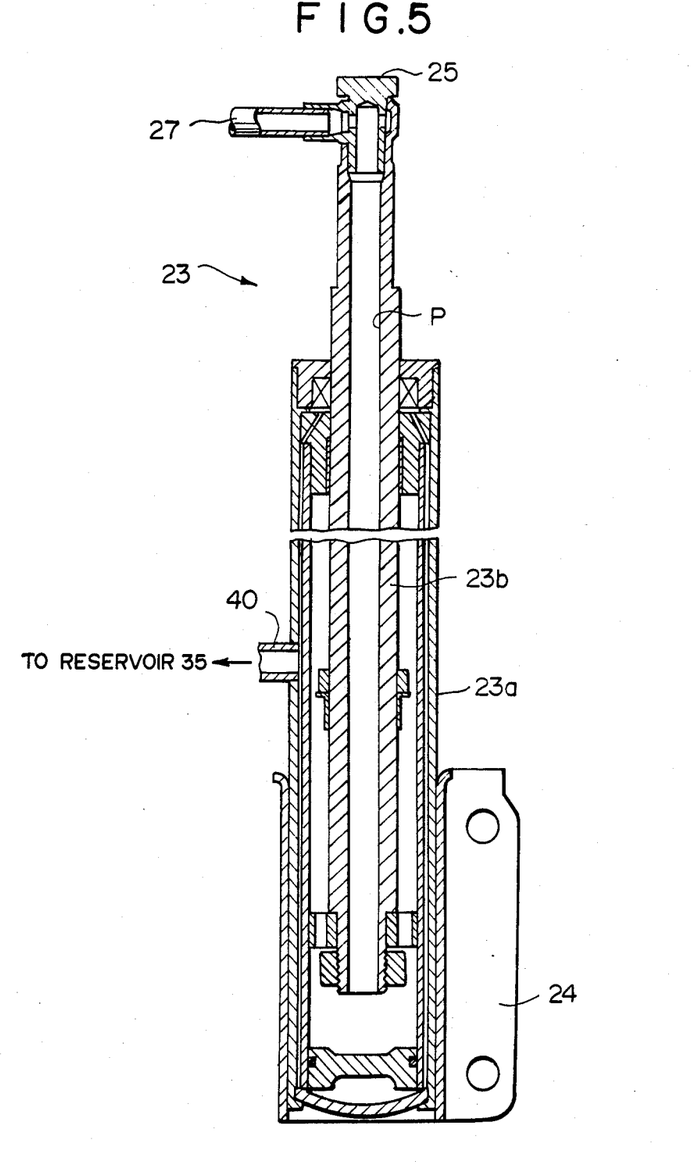
FIG. 5 is an enlarged cross-sectional view showing the strut member employed in the suspension system of FIG. 3, FIGS. 6 to 9 are views for illustrating factors influencing the rate of change of the roll center height of the suspension.

The front and rear suspensions 1 and 2 are basically the same in structure, and therefore only the rear suspension 2 will be described with reference to FIG. 4. The rear suspension 2 comprises a pair of wheel supports 21 for respectively supporting the right and left rear wheels 7R and 7L for rotation, a pair of lower arms 22 extending in the transverse direction of the vehicle body 8. Each lower arm 22 is pivoted to the frame 8a of the vehicle body 8 at one end and to the lower portion of the wheel support 21 for the corresponding wheel at the other end to restrict movement of the corresponding wheel in the transverse direction. A pair of strut members 23 or fluid actuators vertically extend between the right rear wheel 7R and the vehicle body 8 and between the left rear wheel 7L and the vehicle body 8 to support the vehicle body 8. As clearly shown in FIG. 5, the strut member 23 comprises a cylinder 23a defining therein a hydraulic pressure chamber and a piston 23b telescopically received in the cylinder 23a. The lower portion of the cylinder 23a is connected to the upper portion of the wheel support 21 by way of a bracket 24, and the upper end portion of the piston 23b is connected to the vehicle body 8 by way of a mount rubber 25. When pressurized oil is introduced into the pressure chamber in the cylinder 23a through an oil passage P formed in the piston 23b, the piston 23b is moved upward with respect to the cylinder 23a, thereby raising the vehicle body 8. Thus, by controlling the hydraulic pressure to be fed to the strut member 23, the vehicle height can be controlled. The oil passage P of each strut member 23 is connected to an accumulator 26 by way of an oil pipe 27. The accumulator 26 has a gas chamber 26a and an oil pressure chamber 26b therein opposed to each other. The pressure in the hydraulic pressure chamber in the cylinder 23a of the strut member 23 is transmitted to the oil pressure chamber 26b of the accumulator 26 and is supported by compression elasticity of gas confined in the gas chamber 26a. Reference numeral 40 in FIG. 5 denotes a drain passage through which leakage oil leaking between inner and outer tubular members forming the cylinder 23a is returned to a reservoir 35.

The hydraulic pressure to be fed to the strut members 23 of the rear suspension 2 and the strut members 13 of the front suspension 1 is controlled by a vehicle height control device 3 (FIG. 3). The vehicle height control device 3 comprises an oil pump 33 which is driven by a driving motor 31 and delivers pressurized oil to the hydraulic pressure chamber of each strut member by way of a hydraulic circuit 32 and a pair of vehicle height control valves 34 (in the form of a four-port three-position solenoid valve) provided in the hydraulic circuit 32 to respectively control feeding of pressurized oil to the strut members 23 and 13 of the rear and front suspensions 1 and 2. Each of the vehicle height control valves 34 takes three positions, one being a feeding position 34a in which it permits feeding of pressurized oil from the oil pump 33 to the strut members 23 or 13, another being a discharge position 34b in which it permits pressurized oil in the hydraulic pressure chambers of the strut members 23 or 13 to return to an oil reservoir 35, and the other being a neutral position 34c in which it permits neither feeding of pressurized oil to the strut members 23 or 13 nor return of pressurized oil to the oil reservoir.

The vehicle height control valves 34 are controlled by a controller 6 which receives the output of a vehicle speed detecting means 5 and controls the position of the control valves 34. The controller 6 also receives the output of a vehicle height detecting means 4 to effect feedback control on the position of the vehicle height control valves 34 so that the vehicle height is increased during low speed travel and reduced during high speed travel.

Figure 6:
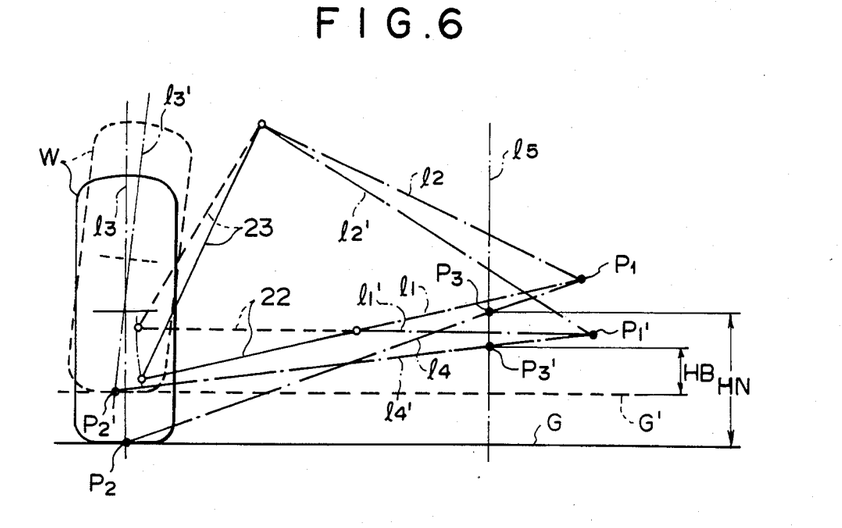

Now the position of the roll center and the rate of change of the roll center height will be described with reference to FIGS. 6 to 9. FIG. 6 schematically shows the left side half of the suspension of the same type as the one shown in FIG. 4. In FIG. 6, P1 denotes the intersection of an inward extension of the lower arm 22 and a line perpendicular to the longitudinal axis of the strut member 23 and passing through the upper end thereof when the wheel W is in its normal position or the position when it experiences neither bump nor rebound as shown by the solid line, while P1' denotes the same when the wheel hits a bump, the solid line G and the dotted line G' respectively representing the road surface when the wheel W is in the normal position and when it hits a bump. The inward extension of the lower arm 22 and the line perpendicular to the longitudinal axis of the strut member 23 and passing through the upper end thereof when the wheel W is in the normal position are respectively indicated at 11 and 12, while those when the wheel W hits a bump are indicated at 11' and 12', respectively. The roll center is defined as the intersection of the line joining the point P1 (P1') and the center of the treading line of the wheel W (the intersection of the vertical center line and the road surface) and the vertical center line 15 of the vehicle body. The roll center, the center of the treading line, the line joining the point P1 and the center of the treading line of the wheel W and the vertical center line of the wheel W when the wheel W is in the normal position are respectively indicated at P3, P2, 14 and 13, while those when the wheel W hit a bump are respectively indicated at P3', P2', 14' and 13'. The roll center heights or the distances between the roll center and the ground surface when the wheel W is in the normal position and when the wheel W hits a bump are respectively indicated at HN and HB.

Generally the amount of change HN-HB in the roll center height for a given amount of bump of the wheel depends upon the length of the lower arm 22, the length of the strut member 23, the inclination of the lower arm 22 and the inclination of the strut member 23.

Figure 7:
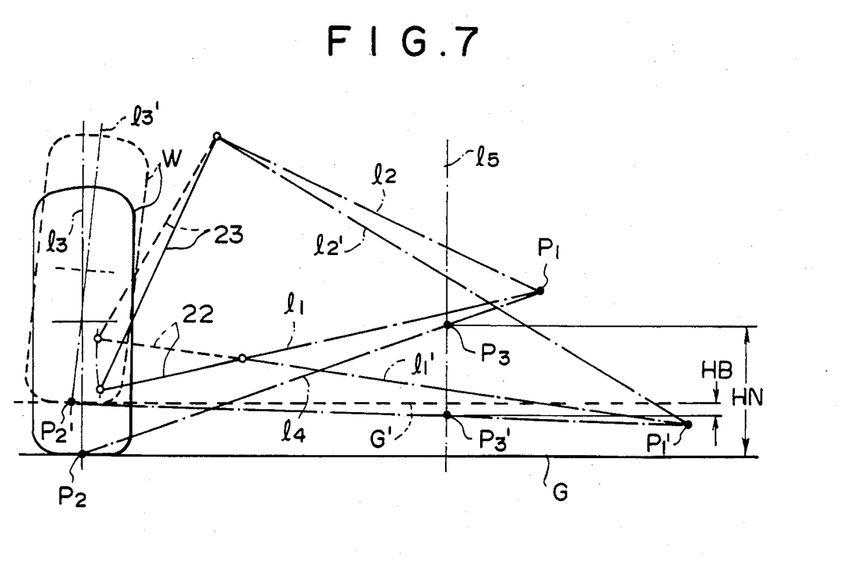

FIG. 7 is a view similar to FIG. 6 but showing the change in the roll center height in the case of a suspension the lower arm of which is shorter than that of the suspension shown in FIG. 6. As can be seen by comparing FIGS. 6 and 7, the rate of change of the roll center height due to bump/rebound is larger in the suspension shown in FIG. 7 than that shown in FIG. 6. Thus, in this case, the suspension shown in FIG. 6 is used as the front suspension 1 and the suspension shown in FIG. 7 is used as the rear suspension 2.

Figure 10:
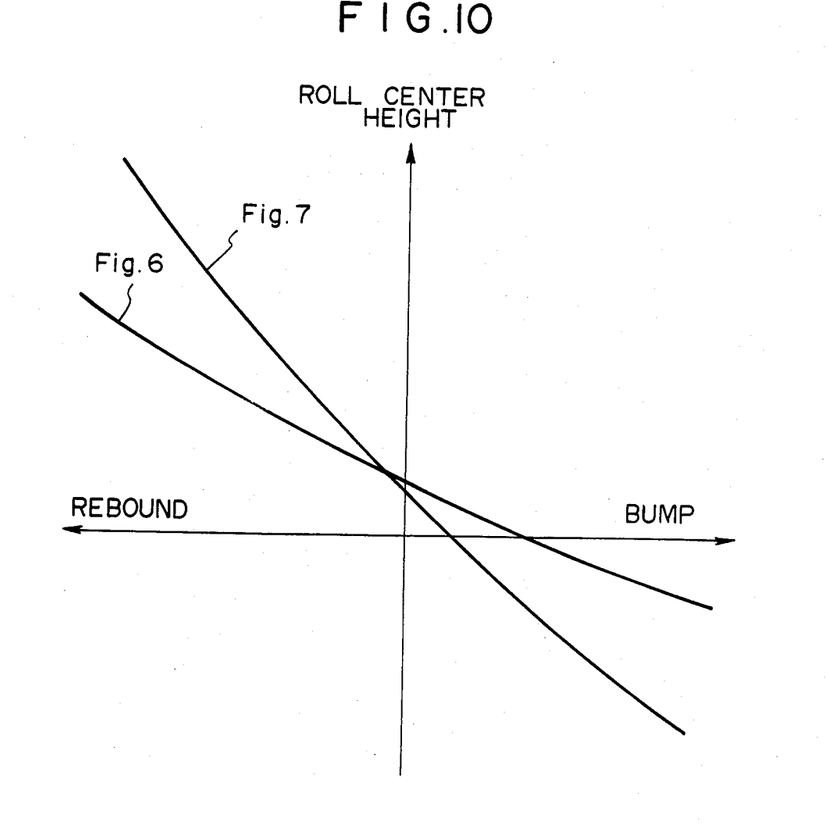
FIG. 10 shows the roll-center-height changing characteristics of the suspensions shown in FIGS. 6 and 7.

FIG. 10 shows the roll-center-height changing characteristics of the suspensions shown in FIGS. 6 and 7. As can be understood from FIG. 10, when the wheels are near their neutral position (corresponding to the origin of the coordinate of FIG. 10), the roll center heights of the front suspension 1 (the suspension shown in FIG. 6) and the rear suspension 2 (the suspension shown in FIG. 7) are substantially equal to each other. However, since the rate of change of the roll center height is larger in the rear suspension 2 than in the front suspension 1, the roll center height of the rear suspension 2 becomes larger than that of the front suspension 1 during rebound, while the latter becomes larger than the former during bump.

When the vehicle height is increased by virtue of the strut members 13 and 23, the roll center heights of the front and rear suspensions 1 and 2 behave in the same manner as when the vehicle rebounds, and when the vehicle height is reduced by virtue of the strut members 13 and 23, the roll center heights behave in the same manner as when the vehicle hits a bump.

When the vehicle speed is high, the controller 6 controls the vehicle height control device 3 to reduce the vehicle height. That is, the pressurized oil in the hydraulic pressure chambers of the strut members 13 and 23 is returned to the oil reservoir 35, whereby the strut members 13 and 23 are contracted. When the strut members 13 and 23 are retracted and the vehicle height is reduced, the roll center of the front suspension 1 becomes higher than that of the rear suspension 2 as described above. Accordingly, the moving load due to inclination of the vehicle body during cornering becomes larger in the front suspension 1 than in the rear suspension 2 so that the cornering force acting on the wheels according to the magnitude of the moving load is more reduced in the front wheels than in the rear wheels, whereby the ratio of side slip in the direction opposite to the cornering which the front wheels experience during cornering to that which the rear wheels experience is increased to enhance the understeer tendency. The running stability during high speed travel is thus improved.

When the vehicle speed is low, the controller 6 controls the vehicle height control device 3 to increase the vehicle height. That is, pressurized oil is fed to the hydraulic pressure chambers of the strut members 13 and 23 whereby the strut members 13 and 23 are extended. When the strut members 13 and 23 are extended and the vehicle height is increased the roll center of the rear suspension 2 becomes higher than that of the front suspension 1 as described above. Accordingly, the moving load due to inclination of the vehicle body during cornering becomes larger in the rear suspension 2 than in the front suspension 1 so that the cornering force acting on the wheels according to the magnitude of the moving load becomes less in the rear wheels than in the front wheels, whereby the ratio of side slip in the direction opposite to the cornering which the rear wheels experience during cornering to that which the front wheels experience is increased to weaken the understeer tendency. The steering performance during low speed travel is thus improved.

Figure 8:
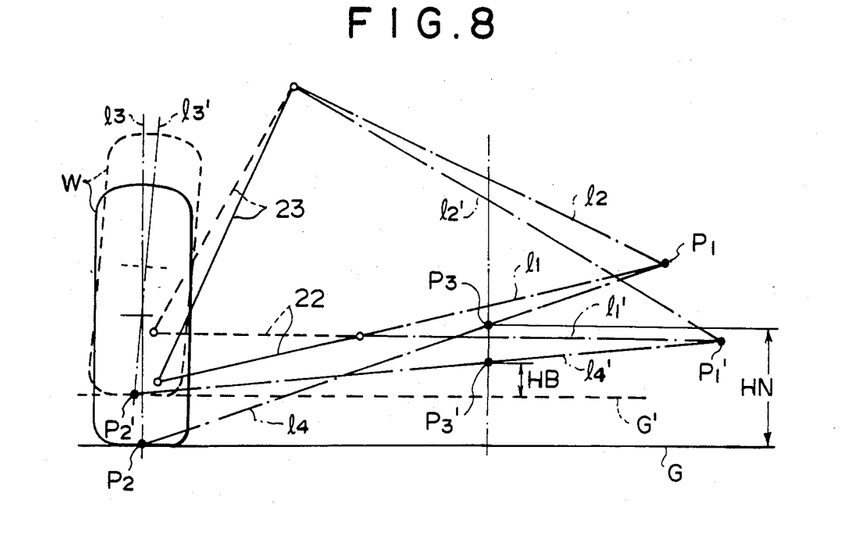

FIG. 8 is a view similar to FIG. 6 but showing the change in the roll center height in the case of a suspension the strut member of which is longer than that of the suspension shown in FIG. 6. As can be seen by comparing FIGS. 6 and 8, the rate of change of the roll center height due to bump/rebound is larger in the suspension shown in FIG. 8 than that shown in FIG. 6. Thus, in this case, the suspension shown in FIG. 6 is used as the front suspension 1 and the suspension shown in FIG. 8 is used as the rear suspension 2.

Figure 9:
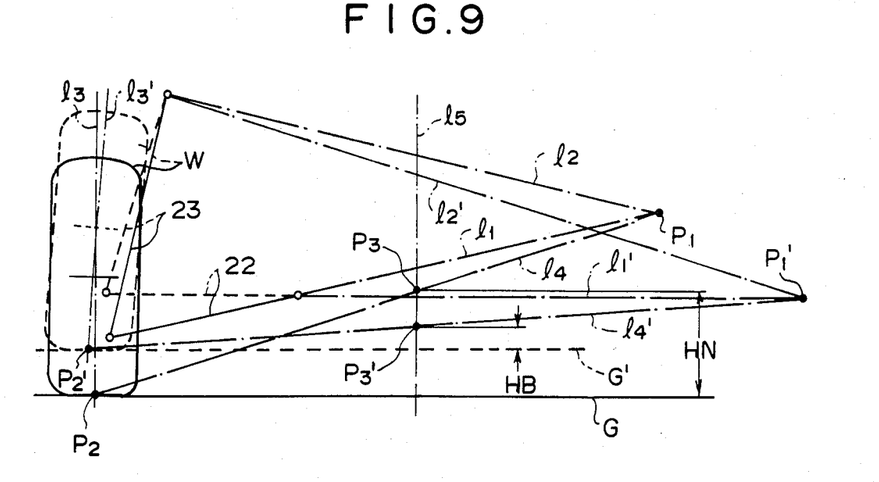

FIG. 9 is a view similar to FIG. 6 but showing the change in the roll center height in the case of a suspension in which the strut member is inclined inward by a smaller angle than that of the suspension shown in FIG. 6. As can be seen by comparing FIGS. 6 and 9, the rate of change of the roll center height due to bump/rebound is larger in the suspension shown in FIG. 9 than that shown in FIG. 6. Thus, in this case, the suspension shown in FIG. 6 is used as the front suspension 1 and the suspension shown in FIG. 9 is used as the rear suspension 2.

Though in the above embodiment, both the front and rear suspensions 1 and 2 are of strut type, they need not be limited to the strut type. The front and rear suspensions may even be of different types from each other.

Further, though in the above embodiment, strut members which are contracted and extended by fluid pressure are used as the adjustable-height supporting means, other suitable means may be used.

We claim:

1. A vehicle suspension system comprising a front suspension for supporting the front wheels, a rear suspension for supporting the rear wheels, an adjustable-height supporting means which connects the front and rear suspensions to the vehicle body and supports the vehicle body to be variable in height with respect to the front and rear suspensions, a vehicle speed detecting means which detects the vehicle speed, and a control means which receives the output of the vehicle speed detecting means and controls the adjustable-height supporting means so that the vehicle height is increased during low speed travel and is reduced during high speed travel, said front and rear suspensions being arranged so that the rate of change of the roll center height due to bump/rebound is larger in the rear suspension than in the front suspension.

2. A vehicle suspension system as defined in claim 1 in which said adjustable-height supporting means comprises a fluid actuator which is contracted and extended by fluid pressure imparted thereto, and said control means controls fluid pressure to be imparted to the fluid actuator.

3. A vehicle suspension system as defined in claim 2 in which the roll center height of the front suspension is made higher than that of the rear suspension during high speed travel, and is made lower than the same during low speed travel.

4. A vehicle suspension system as defined in claim 2 in which each of the front and rear suspensions includes a pair of suspension arms which extend in the transverse direction of the vehicle body and each of which connects the corresponding wheel support to the vehicle body, the suspension arms in the front suspension being longer than those in the rear suspension.

5. A vehicle suspension system as defined in claim 4 in which each wheel support is connected to the vehicle body by a strut member which extends vertically and is telescopic in the axial direction thereof.

6. A vehicle suspension system as defined in claim 5 in which said strut member comprises a pair of parts which are movable toward and away from each other to form a variable-volume chamber therebetween, thereby forming said fluid actuator, said control means being adapted to feed and discharge liquid to and from the variable-volume chamber to control the vehicle height, the variable-volume chamber further being connected to a liquid chamber of an accumulator having the liquid chamber and a gas chamber.

7. A vehicle suspension system as defined in claim 6 in which the roll center height of the front suspension is made higher than that of the rear suspension during high speed travel, and is made lower than the same during low speed travel.

8. A vehicle suspension system as defined in claim 2 in which each wheel support is connected to the vehicle body by a strut member which extends vertically and is telescopic in the axial direction thereof, the strut member comprising a pair of parts which are movable toward and away from each other to form a variable-volume chamber therebetween, thereby forming said fluid actuator.

9. A vehicle suspension system as defined in claim 8 in which said control means is adapted to feed and discharge liquid to and from the variable-volume chamber to control the vehicle height, the variable-volume chamber further being connected to a liquid chamber of an accumulator having the liquid chamber and a gas chamber.

10. A vehicle suspension system as defined in claim 2 in which each of the front and rear suspensions is of strut type having a strut member which connects each wheel support to the vehicle body, the strut members in the rear suspension being longer than those in the front suspension.

11. A vehicle suspension system as defined in claim 2 in which each of the front and rear suspensions is of strut type having a strut member which connects each wheel support to the vehicle body, the strut members in the rear suspension being inclined inward by an angle smaller than the strut members in the front suspension.

* * * * *